United States Patent [19]
Brunel

[11] 3,891,262
[45] June 24, 1975

[54] FOLDING CARRIER RACK FOR PICK-UP TRUCKS

[76] Inventor: John R. Brunel, 5887 Greenridge Rd., Castro Valley, Calif. 94546

[22] Filed: Dec. 17, 1973

[21] Appl. No.: 425,260

Related U.S. Application Data

[63] Continuation-in-part of Ser. No. 309,368, Nov. 24, 1972, abandoned.

[52] U.S. Cl. ............ 296/3; 224/42.45 R; 211/178 R
[51] Int. Cl. ............................................. B60p 3/00
[58] Field of Search ................. 296/3, 7, 10, 13, 14; 224/29, 42.32, 42.45 R; 211/149, 178 R; 248/188.6, 439

[56] References Cited
UNITED STATES PATENTS

| | | | |
|---|---|---|---|
| 1,419,007 | 6/1922 | Barrett | 211/178 R |
| 2,570,802 | 10/1951 | Hatteburg | 224/42.45 R |
| 3,097,012 | 2/1963 | Bain | 296/10 |
| 3,765,713 | 10/1973 | Suitt | 296/3 |

*Primary Examiner*—Philip Goodman
*Assistant Examiner*—John A. Carroll
*Attorney, Agent, or Firm*—James R. Cypher

[57] ABSTRACT

A folding carrier rack consisting briefly of a pair of pivotally mounted frames movable from a horizontal folded position to an upright carrying position. Each frame having a releasable lockable brace rigidly holding the frame in an upright position. The frames being releasably affixed to the load bed of the truck.

4 Claims, 18 Drawing Figures

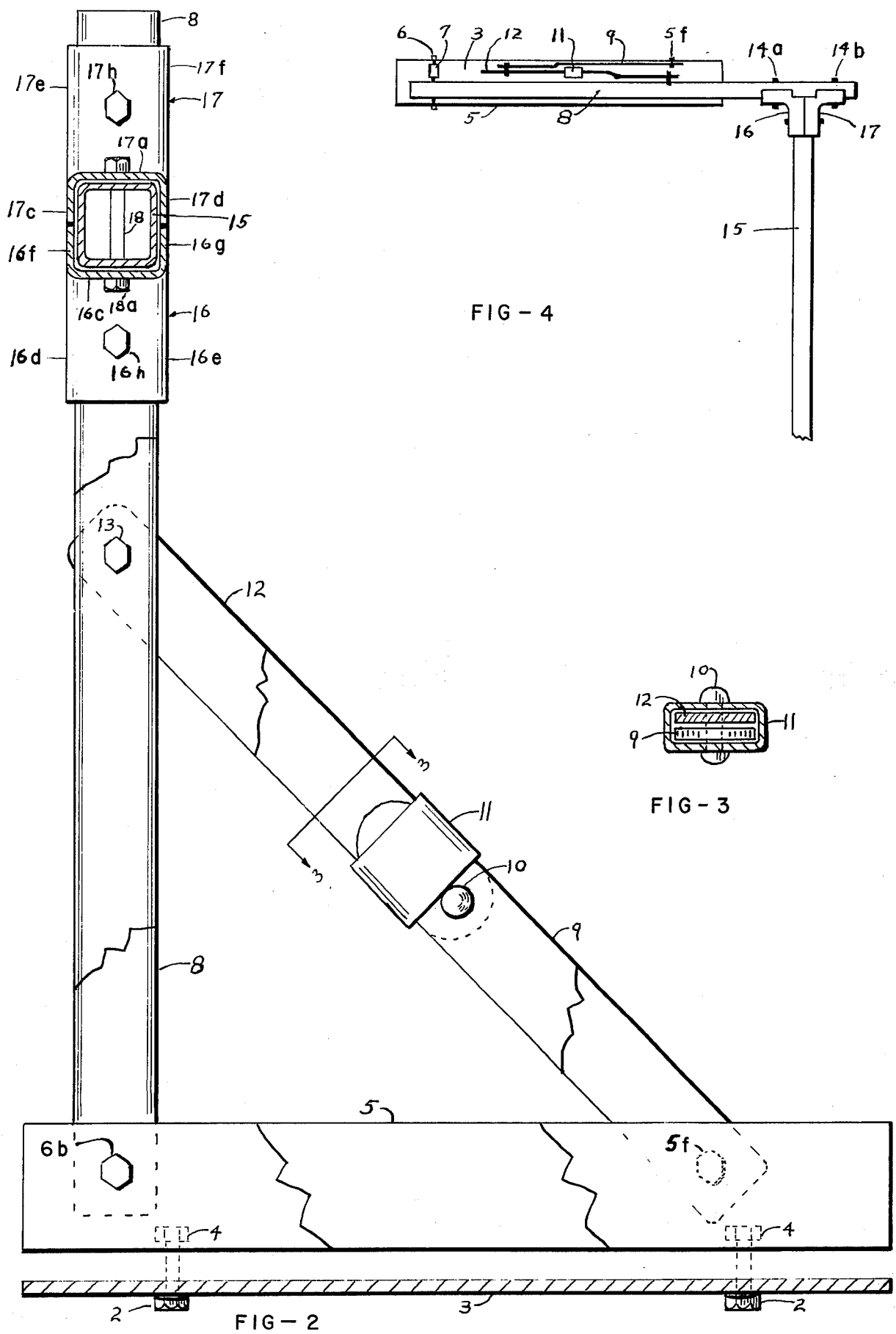

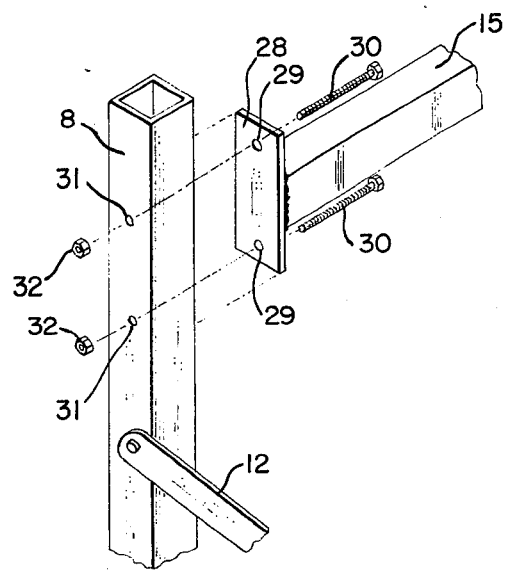
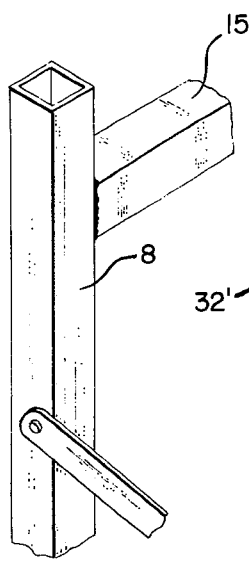
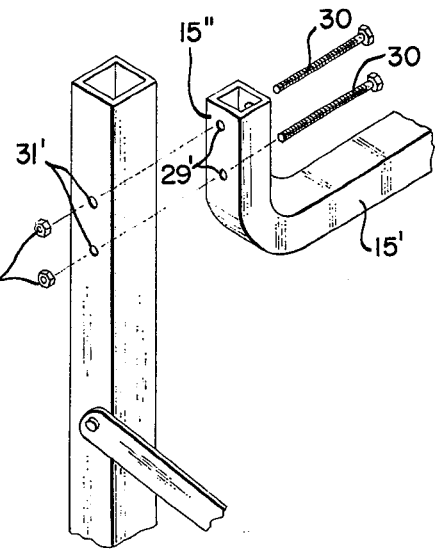
FIG. 12  FIG. 13  FIG. 14
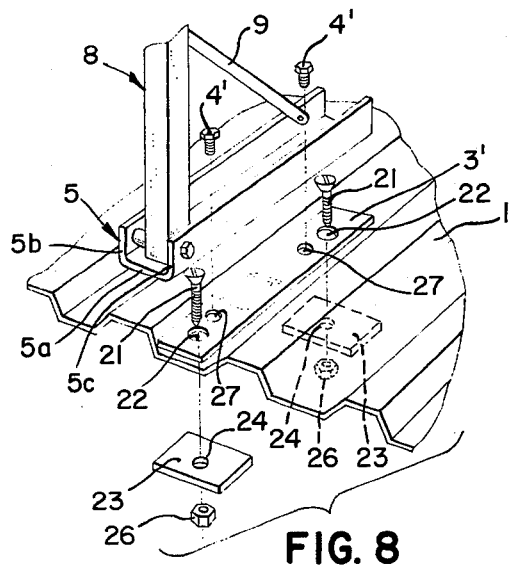
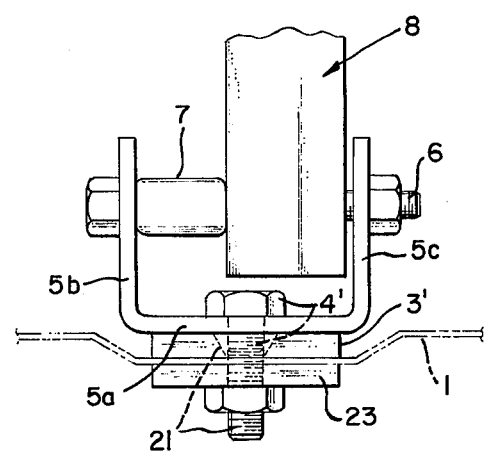
FIG. 8  FIG. 9
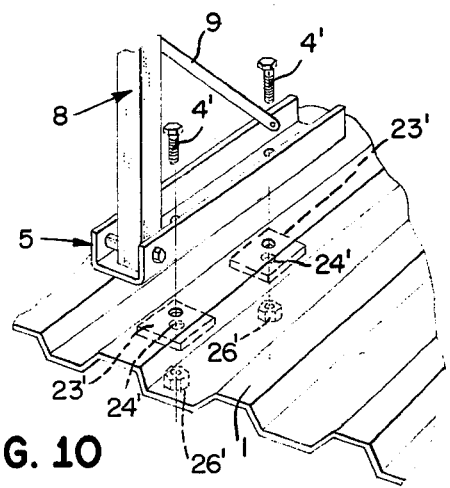
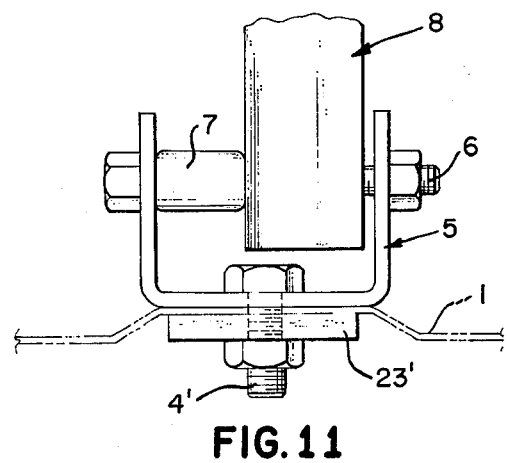
FIG. 10  FIG. 11

FOLDING CARRIER RACK FOR PICK-UP TRUCKS

BACKGROUND OF THE INVENTION

This application is a continuation-in-part of my application Ser. No. 309,368 filed on Nov. 24, 1972 now abandoned.

In the early 30's, the automobile industry introduced the socalled "pick-up truck." This vehicle was part truck and part auto, but primarily it was a small, light truck. From the beginning, contractors and tradesmen custom built load racks on these vehicles so that ladders, boards and other objects which exceeded the length of the bed could be carried by extending the objects over the roof of the cab.

In the early 50's, Detroit and foreign manufacturers changed the amenities of the pick-up truck and introduced the suburban pickup under various names such as "Ranchero, El Camino, Datsun and Toyota." This vehicle still retained the short truck bed but the cab and body were distinctly a family automobile in styling and comfort. This suburban pick-up truck and the regular pick-up truck have become truly dual purpose vehicles since they are utilitarian in function, yet are socially acceptable as a suburban car for nonutilitarian use and are driven by women and used in much the same manner as a station wagon.

While the need for load racks was equally as great for the suburban pick-up trucks as the common utilitarian pick-up trucks, few racks were used as the unsightly load racks defeated the dual purpose for which the vehicles were designed. Some vehicles in this category, suburban and foreign, are not even constructed with the familiar corner pockets provided in the standard truck-type pick-ups for attachment of the load racks.

Present standard welded carrier racks are bulky, difficult to remove and many people do not have a place to store the rack.

SUMMARY OF THE INVENTION

This gist of the present invention is the use of pivotally mounted frames which move to a horizontal storage position on the bed of the vehicle and to an upright load-carrying position. The load position is such that long members will be positioned above the cab roof and the rack cannot ordinarily be seen in the storage position.

Accordingly, an object of the present invention is to provide a carrier rack for suburban pick-up trucks and conventional pick-up trucks which will enable them to have the same capacity for carrying long objects as ordinary stationary welded carriers and yet which can be folded to a stored position, out of sight.

Another object is to provide a carrier rack which is relatively inexpensive to construct, easy to mount on all suburban and utility pick-up trucks or even flat bed trucks, and which can be easily and quickly moved to either the storage or carrying position in a matter of seconds.

Still another object is to provide a carrier rack which is aesthetically compatible with the character of suburban and pick-ups to accommodate the broader use of the vehicle yet is rugged, light weight and maintenance free.

A still further object is to provide a carrier which can be removed entirely from the pick-up except for a flat base if it is desired to carry a camper rig or other object wherein the frames might interfere. Another advantage is the ability to fold the rack so the truck can be cleaned in an automatic car wash.

A further object is to provide a carrier as described in which the cross members can be individually removed so that loads can slide the length of the bed when the carrier is folded.

BRIEF DESCRIPTION OF THE DRAWINGS

FIG. 2 is a side elevation view of a portion of the rack with portions removed so as to more clearly show the relationship of the parts on a single drawing taken generally along line 2—2 of FIG. 6. The rack is shown in the load carrying position in this figure.

FIG. 3 is a cross sectional view taken generally along line 3—3 of FIG. 2.

FIG. 4 is an enlarged view of a section of the rack shown in FIG. 5.

FIG. 8 is a partial exploded view of the carrier and the bed of a pick-up truck in perspective showing another form of connection of the carrier to the truck bed.

FIG. 9 is an end view of the carrier shown in FIG. 8.

FIG. 10 is a partial exploded view of the carrier and the bed of a pick-up truck in perspective showing still another form of connection of the carrier to the truck bed.

FIG. 11 is an end view of the carrier shown in FIG. 10.

FIG. 12 is a partial perspective view of another form of connection between the post and cross member.

FIG. 13 is a partial perspective view of still another form of connection between the post and cross member.

FIG. 14 is a partial perspective view of a still further form of connection between the post and cross member.

BRIEF DESCRIPTION OF THE PREFERRED EMBODIMENTS

The invention consists briefly of a folding front frame A and a folding rear frame B. The front and rear frames are identical and only one set of frames will be fully described.

Figure 1:
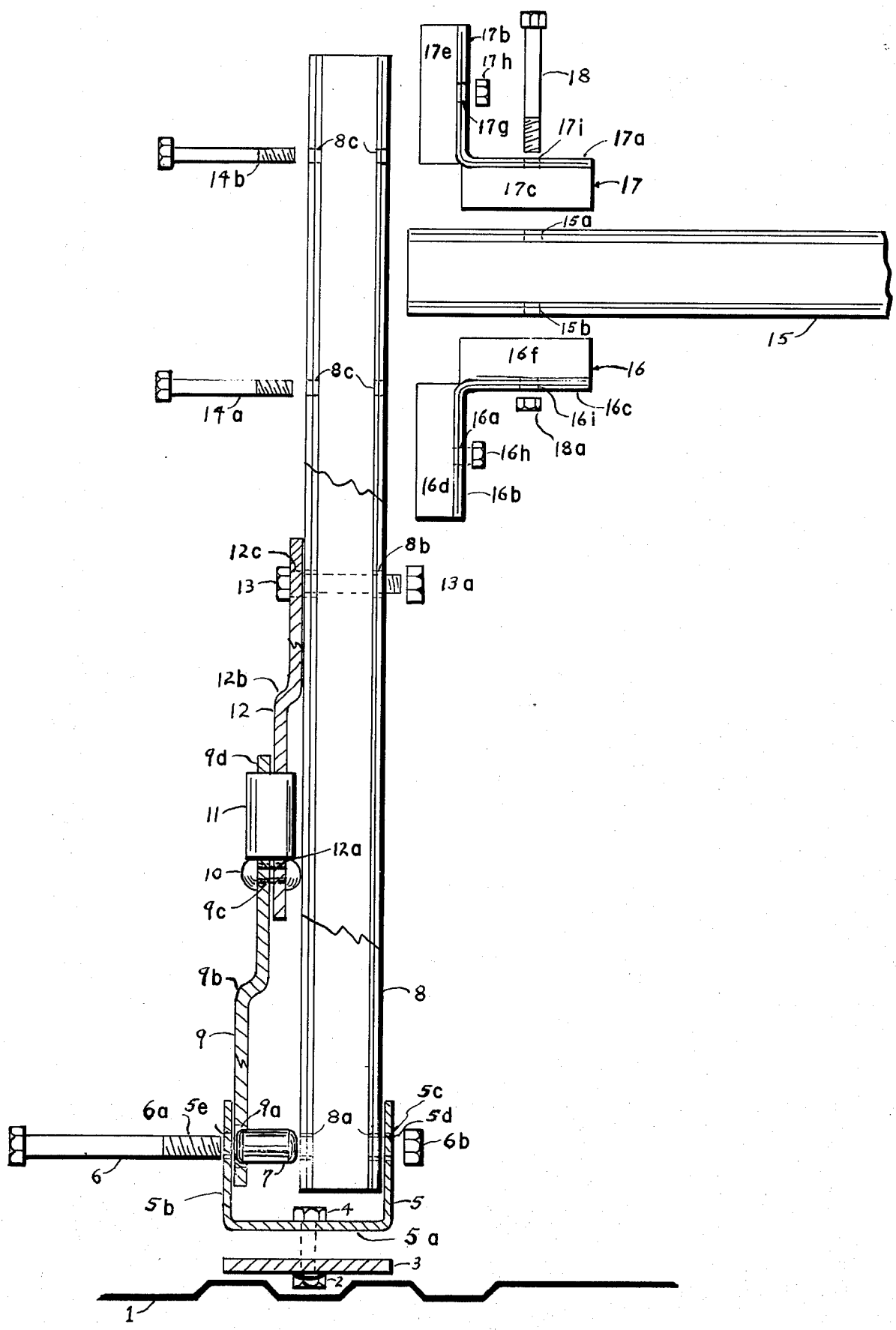
FIG. 1 is an enlarged view of and end of the load carrier rack constructed in accordance with the present invention shown in FIG. 6 and showing sections of the load carrier rack.
Figure 7:
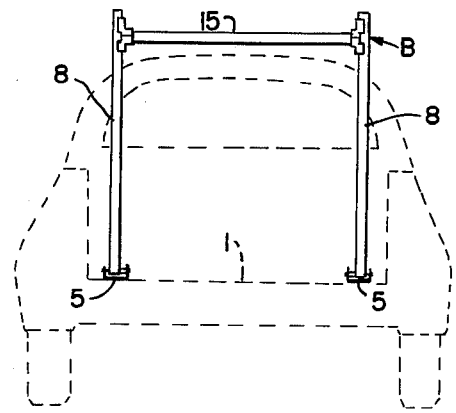
FIG. 7 is a rear end elevation view of the rack in the carrying position.
Figure 6:
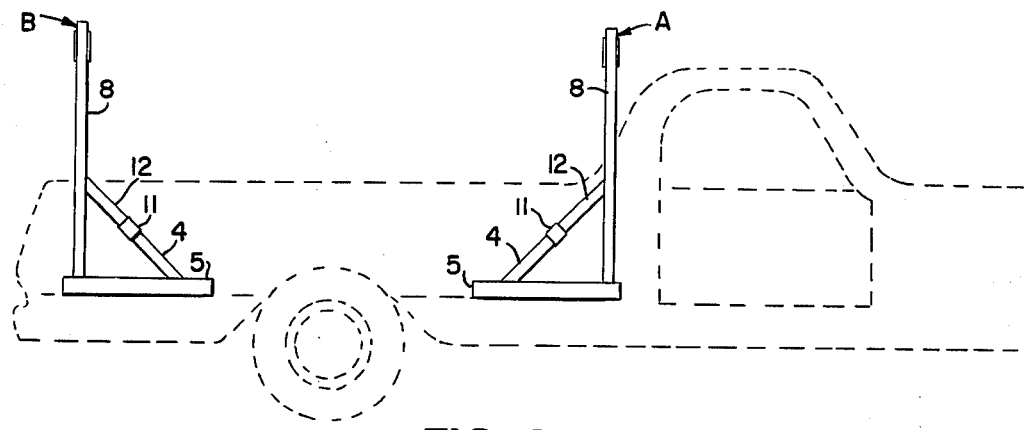
FIG. 6 is a side elevation view of the rack in the carrying position.
Figure 5:
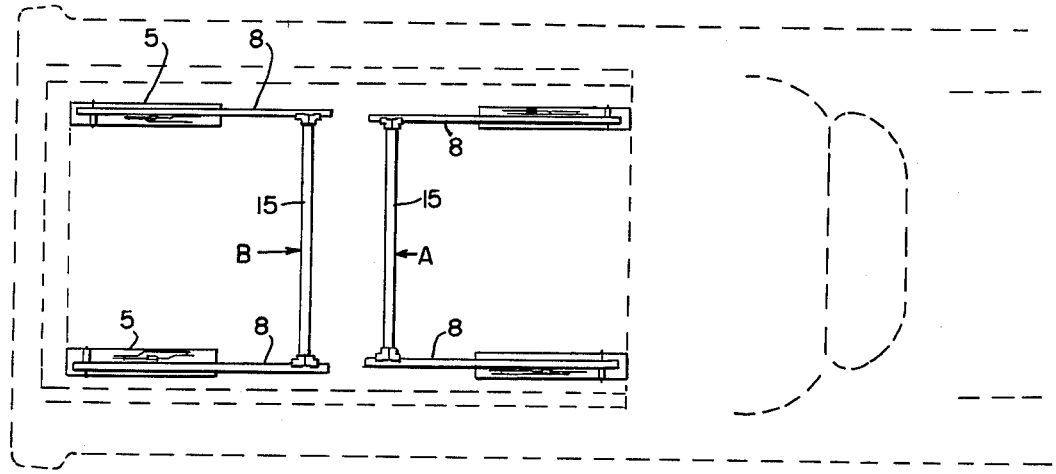
FIG. 5 is a plan view of the load rack in the stored position.

FIGS. 5 – 7 illustrate a suburban type pick-up truck in dotted line. In FIG. 1, a cross section of the corrugated load-carrying bed 1 of the pick-up truck is shown. The rack of the present invention is constructed in the following manner. A threaded nut 2 is welded to the underside of an elongated metal plate 3. Plate 3 is attached to the bed 1 as by welding or by bolts. A plurality of threaded bolts 4 are inserted through openings in a metal channel member 5 which is roughly the length of the plate 3, the bolts 4 are threadably received in nuts 2 thereby securing channel 5 to plate 3. The channel consists of a horizontal member 5a and upstanding legs 5b and 5c. The upstanding legs are drilled with suitable holes into which are inserted typical bolts 6 and a bushing 7. Threaded portion 6a of the bolt is threadably received by nut 6b located on the outside edge of upstanding leg 5c. An elongated post member 8 formed with an opening 8a for receiving bolt 6 forms one side of the load-carrying frame. The frame pivots about bolt 6 between a first position in which the post is in a substantially horizontal position and a second position in which the post is in a substantially vertical position.

The post is held in the upright second position by means of an assembly which consists of an elongated flat bar 9 formed with an opening 9a at its lower end for receiving bolt 6. The flat bar is formed with an offset portion 9b as shown in FIG. 1. At its upper end, the bar is formed with an opening 9c through which a rivet 10 is inserted. The rivet also is inserted through an opening 12a which is formed in a second flat bar 12. Flat bar 12 also has an offset portion 12b as shown in FIG. 1 and an opening 12c in its other end for receiving a threaded bolt 13. Bolt 13 is inserted through an opening 8b in the post member and is received by nut 13a for pivotal attachment of the flat bar 12 and post member 8.

The flat bar members 9 and 12 are selectively joined to one another by a locking sleeve 11 consisting of a band of metal which is placed around flat bar 12 and slips over end 9d of flat bar 9.

Flat bar member 9 is pivotally attached to channel 5 by a bolt 5f inserted through opening 5e in channel leg 5b and opening 9a in flat bar member 9.

The upper cross bar member 15 is attached to the post member in the following manner. In the upper portions of the post member, a pair of openings 8c are formed which receive threaded bolts 14a and 14b, the lower of the two bolts is inserted through an opening 16a in an angle 16. Angle 16 is formed with sides 16b and 16c. Side 16b is formed with flanges 16d and 16e which extend at right angles therefrom and are formed and dimensioned to snugly enclose 3 sides of post member 8.

Side 16c is formed in like manner with right angularly related flanges 16f and 16g which fit snugly around three sides of cross member 15. Both 14a is connected to angle 16 by nut 16h.

A second angle 17 located above the cross bar consists of right angularly related sides 17a and 17b. Side 17a consists of parallel spaced flanges 17c and 17d fit snugly around the upper portion of member 15. Side 17b consists of parallel flanges 17e and 17f which are dimensioned to fit snugly around post member 8. Bolt 14b is inserted through opening 17g and is threadably connected to nut 17h to connect post member to angle 17.

Threaded bolt 18 joins angles 16 and 17 to cross member 15 by being inserted through 17i in an angle 17, opening 15a and 15b in member 15 and opening 16i in an angle 16. A nut 18a is threadably received on the end of bolt 18.

The frame A and frame B are identical in construction and the various parts which correspond have been given identical numbers. Frame B folds toward the front of the truck and frame A folds to the rear of the truck.

In operation, the frames are erected from a stored horizontal position as shown in FIG. 5 to a load carrying position as shown in FIG. 6 as follows: Post 8 is pivoted about bolt 6 until it assumes a nearly vertical position. Flat bar members move from a parallel position through an angular relationship and then when they are nearly in alignment, sleeve 11 is moved over end 9d of flat member 9 thereby locking members 9 and 12 together. As shown in FIG. 2 when members 12 and 9 are locked together, they form a rigid brace which holds post 8 in the upright position. In like manner a similar brace assembly at the other end of the frame is locked into position. Next the other frame is raised in an identical manner. When both the front and rear frames are raised and locked in place, the rack is ready for receiving ladders, boards and the like which can extend over the cab of the truck.

As an alternate design, the front cross bar 15 may be slightly elevated above the rear cross member 15 so that the ladders and boards or other long objects assume an angle with the horizontal.

As shown in the drawings, the cross member is attached to the posts by bolts. The cross member could also be attached to the angles 16 and 17 by welding and the angles could be attached to the posts by welding.

It may be seen that the frames may be removed from the pickup truck by merely unfastening bolts 4.

A unique feature of the present invention is the fact that when the frames are in the horizontal stored position, the locking bracing i.e. member 9 and 12, are stored within the 5b and 5c of the channel member 5. Thus when objects are hauled in the bed of the truck when the rack is in the folded position, the bracing members will be protected and will be less subject to damage by bending.

As a further alternative, in some applications, it may only be necessary to provide a front frame. Thus the rear portion of a ladder or other long object could rest on the rear portion of the truck bed, and a front frame would elevate the long object so that it would be positioned at an angle with the front portion of the object extending over the cab of the truck.

Another alternative is to make the rear frame shorter than the front frame so that the article being carried is placed at an angle. In some foreign pick-up trucks, the truck bed is so short that in order to have the frames lie flat it may be necessary to make the rear frame shorter than the front frame. As may be seen in FIG. 5, cross arm 15 of the rear frame may be slightly longer than cross arm of the front frame so that the ends of the post members of the front frame will nest within the ends of the post members of the rear frame.

The present invention permits the front or the rear frame to be positioned upright while the other frame is folded and in the storage position. This arrangement has advantages in several situations. When a person is carrying tall barrels, window screens, a refrigerator, water heater, welding bottles or other tall object which cannot or should not be laid flat, the rear frame of the standard rack is in the way and prevents easy loading of the truck. With the present invention, the rear frame can be laid flat, the object easily loaded and then the refrigerator or other object can be tied to the front frame.

The ability to quickly fold the rack to a flat stored position occurs where contractors or tradesmen haul materials such as lumber to the job site with the rack in the upright position, and then wish to haul debris away from the job at the end of the day. A plywood sheet can be laid on top of the folded rack and the junk and debris easily loaded on the truck. Standard non-foldable racks restrict the type of debris that can be easily loaded because of the low cross bar in the rear. The problem becomes acute when it is realized that some pick-up cab roofs are only about 36 inches above the floor of the bed. Since most people want a rack which is only a few inches above the cab roof, it can be easily seen that the clear opening on some pick-up trucks with standard racks is only about 38 inches.

Another modification that can be made with the present rack is to locate the post members closer together so that tool boxes can be stored longitudinally along the sides of the truck.

Still another modification is to locate the front frame several inches behind the cab so that a tool box can be stored between the front frame of the rack and the front of the truck bed.

Referring to FIG. 8, an alternate form of the invention is shown. The load rack is identical to the rack earlier described and consists of a channel 5 having a horizontal member 5a and upstanding legs 5b and 5c. A tubular post 8 is pivotally connected to the channel and a brace member is also pivotally connected to the channel member. A plate member 3' is connected to the bed 1 of the truck. The plate may be connected by welding or by fasteners such as threaded bolts 21 inserted through openings 22 in the plate and in the bed of the truck. A washer or flat member 23 is placed on the other side of the truck bed as a load distributing member and has an opening 24 through which threaded bolts 21 are inserted. Nuts 26 are threaded upon bolts 21 to clamp the plate and washer securely against the bed of the truck. The entire rack member may be releasably connected to plate 3' by means of threaded bolts 4' which are inserted through openings in the channel member 5 and are threadably received in openings 27 in plate 3'.

FIG. 9 is an end view of the rack showing the pivot bolt 6 and spacer 7.

FIG. 10 shows another alternate form of the invention in which the rack is identical to the rack shown in FIG. 8. The method of attachment to the bed of the truck 1 is different and here consists of load distributing members 23' which may be circular washers or square members, as shown in the drawing. The members have openings 24' through which threaded bolts 4' are inserted and threadably lock with nuts 26'. The load distributing members 23' are positioned on the underside of the truck bed 1.

FIG. 12 shows an alternate form of connecting the cross member 15 to the post 8. A plate 28 is welded to the end of the cross member and has openings 29 for the insertion of threaded bolts 30 therethrough. The bolts continue through openings 31 in the post and engage nuts 32. In this form of the invention, the cross member 15 may be readily removed from the posts so that when the rack is folded, the cross member will not interfere with the loading of the truck bed.

FIG. 13 shows still another form of the invention in which the cross member 15 is welded directly to the post member 8.

FIG. 14 shows a modified form of the invention in which the cross member 15' is formed with a 90° bend at its end 15" and threaded bolts 30 may be inserted through openings 29' and through openings 31' in the post and engage threaded nuts 32'.

Figure 15:
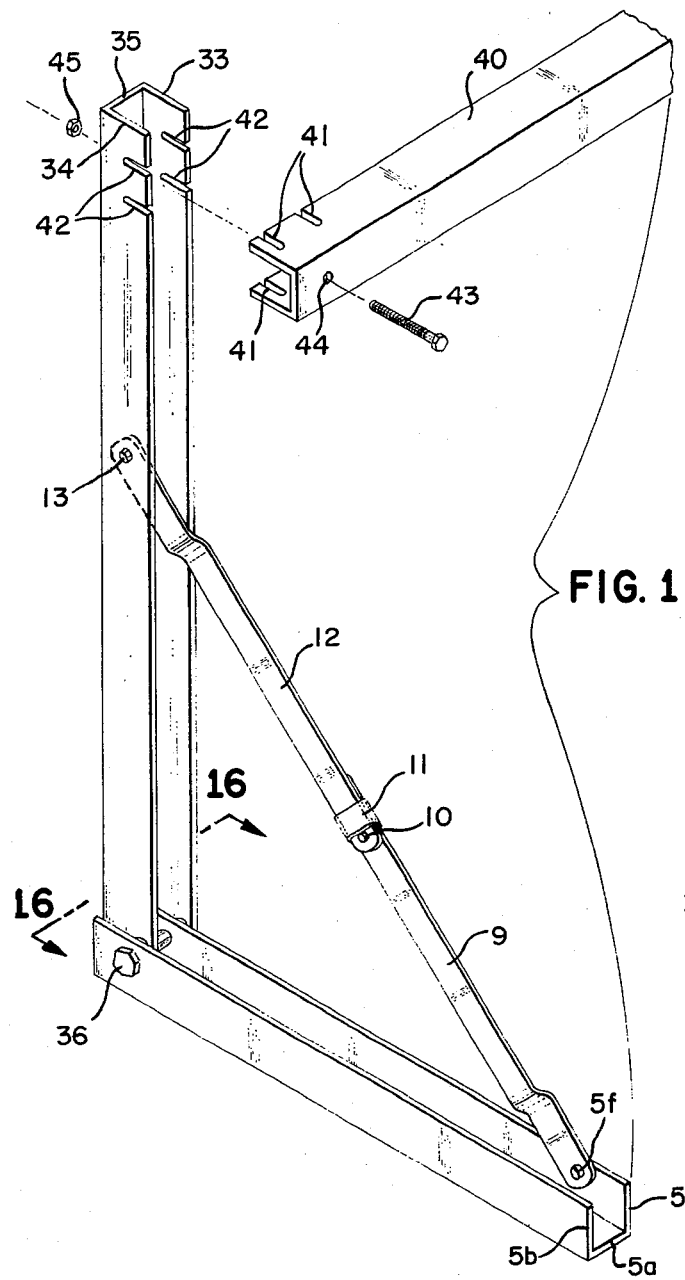
FIG. 15 is a partially exploded perspective view of another alternate form of connection between the post and cross member.
Figure 17:
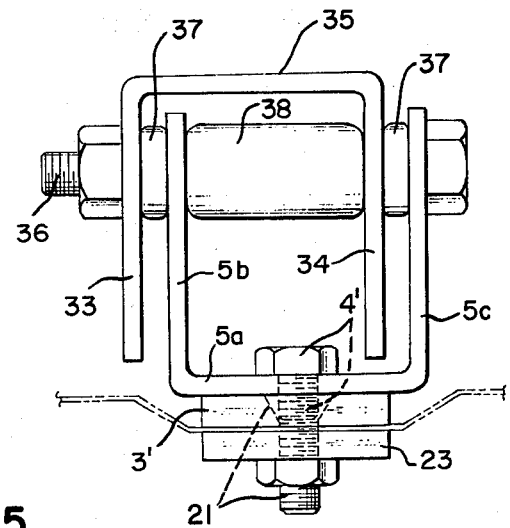
FIG. 17 is an end view similar to FIG. 16 but with the carrier in the folded position.
Figure 16:
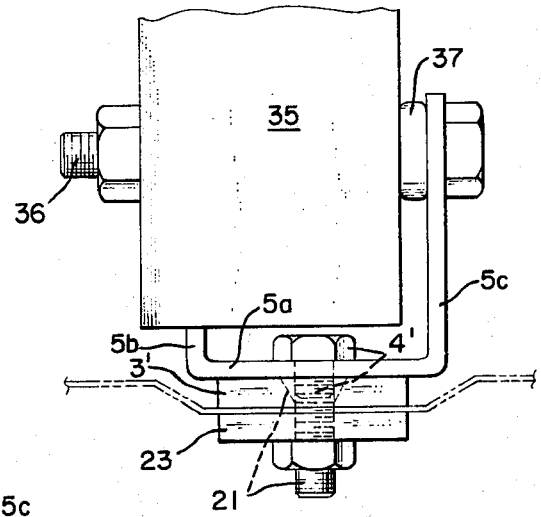
FIG. 16 is an end view of the carrier taken along lines 16—16 of FIG. 15.
Figure 18:
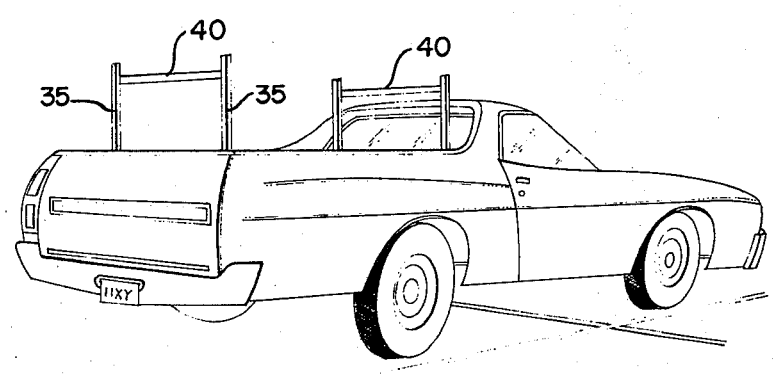
FIG. 18 is a perspective view of the carrier of the present invention mounted on a pick-up truck.

Still another form of the invention is shown in FIGS. 15 through 17. In this form of the invention the same channel member as previously described is used having a base 5a and upstanding flanges 5b and 5c. In addition, the same brace member as previously described is used with brace members 9 and 12 joined at pin 10 and held in locked position by locking sleeve 11. The brace is pivotally connected to the post by bolt 13 and pivotally connected to the channel by bolt 5f. In this form of the invention, the post is constructed using a channel member having flanges 33 and 34 and a base 35. The post is pivotally connected to the base channel by bolt 36. The post channel is interfitted with the base channel with member 34 located between flanges 5b and 5c and flanges 33 falling on the outside of the base channel. The advantage of this form of the invention is seen in FIG. 17 in which the channels fit within one another and the base 35 of the post channel forms a flat surface over most of the folded rack. It should be noted that washers 37 and a spacer 38 may be mounted on bolt 36.

The channel post provides an additional method of attaching the cross member 40. While it is obvious that the method of joining the cross member could be the same as shown in FIGS. 12, 13, 14 or FIG. 1, a preferred method is shown in FIG. 15. As shown in FIG. 15 the cross member is formed with pairs of parallel open ended slots 41 which are dimensioned and arranged for interfitting releasable connection with pairs of parallel open ended slots 42 formed in the distal end of the post. A single threaded bolt 43 inserted through opening 44 in the cross member and an opening in the post member and engaging threaded nut 45 is sufficient to releasably join the cross member and post.

I claim:

1. A folding rack for a pick-up truck comprising:
    a. a pair of spaced parallel base members each consisting of a flat plate member permanently attached to the bed of said truck and a channel member having upturned flanges releasably connected to said flat plate;
    b. holding means consisting of a plurality of load spreading members carried on the underside of said pick-up bed and a plurality of threaded bolts and nuts releasably connecting said base members to said load spreading members;
    c. a pair of post members pivotally attached to said base members and movable from a first stored position, wherein they are substantially in a horizontal position, to a second load-carrying position wherein they are substantially in a vertical position;
    d. bracing means constructed so as to fold within the upturned flanges of said base members including a first member pivotally connected at one end to said base member and connected at the other end in a rotatable connection to a second member which is attached at its other end in a pivotal connection to said post member;

e. means rigidly connecting said bracing members together in general alignment when said post members are in the second position; and f. a cross-member connecting the upper ends of said post members forming a load-carrying elevated surface.

2. A folding carrier rack for a pick-up truck as described in claim 1 comprising:

a. a second rack consisting of elements a through e of claim 1, and b. said base members of said second rack being spaced from said base members of said first rack along the longitudinal axis of said truck so as to permit loads to be carried at an elevation above the cab of said vehicle.

3. A folding carrier rack as described in claim 1 comprising:

a. said post members are channel shaped and arranged to interfit with said base flanges so that the flanges of said post members depend downwardly in said first stored position and the base of said post channel member overlaps only one of said upturned flanges of said base member.

4. A folding carrier rack as described in claim 3 comprising:

a. the upper ends of said posts are formed with a pair of parallel open ended slots in each of the flanges;

b. said cross member is channel shaped and the flanges of both ends are formed with pairs of parallel open ended slots dimensioned and arranged for interfitting releasable connection with said slots in said posts; and c. fastening means releasably connecting said cross member to said posts.

* * * * *